(12) United States Patent
Rutz

(10) Patent No.: US 9,364,080 B2
(45) Date of Patent: Jun. 14, 2016

(54) FURNITURE ACCESSORY IN THE FORM OF A CABLE BASKET

(71) Applicant: Steelcase Werndl AG, Rosenheim (DE)

(72) Inventor: Josef Rutz, Rosenheim (DE)

(73) Assignee: Steelcase Werndl AG, Rosenheim (DE)

( * ) Notice: Subject to any disclaimer, the term of this patent is extended or adjusted under 35 U.S.C. 154(b) by 0 days.

(21) Appl. No.: 14/431,930

(22) PCT Filed: Oct. 25, 2012

(86) PCT No.: PCT/EP2012/004469
§ 371 (c)(1),
(2) Date: Mar. 27, 2015

(87) PCT Pub. No.: WO2014/063717
PCT Pub. Date: May 1, 2014

(65) Prior Publication Data
US 2015/0282612 A1    Oct. 8, 2015

(51) Int. Cl.
*A47B 37/00* (2006.01)
*A47B 21/06* (2006.01)
(Continued)

(52) U.S. Cl.
CPC . *A47B 21/06* (2013.01); *F16L 3/06* (2013.01); *F16L 3/16* (2013.01); *A47B 2097/003* (2013.01)

(58) Field of Classification Search
CPC .. A47B 21/00; A47B 21/06; A47B 2021/062; A47B 2021/064; A47B 2021/066; A47B 2021/068; A47B 2200/0084; A47B 13/16; A47B 37/00; A47B 2097/003; A47D 1/008; F16L 3/06; F16L 3/16

USPC ............ 108/50.02, 50.01, 26, 25; 312/223.6, 312/223.1, 223.2, 223.3, 246

See application file for complete search history.

(56) References Cited

U.S. PATENT DOCUMENTS 1,369,214 A * 2/1921 Baker .................... A47B 13/16
   108/50.02
4,734,826 A * 3/1988 Wilson ................... A47B 21/06
   361/729

(Continued)

FOREIGN PATENT DOCUMENTS

AT        508414    1/2011
CN       2691125    4/2005
(Continued)

OTHER PUBLICATIONS

European Patent Office, International Search Report, Jun. 12, 2013.

*Primary Examiner* — Jose V Chen
(74) *Attorney, Agent, or Firm* — Price Heneveld LLP

(57) ABSTRACT

A furniture accessory includes a bracket having first and second retaining elements, a basket having first and second fastening elements that fasten the basket to the bracket by the retaining elements, wherein the basket is swivelable about a first and second axes, a slider movably mounted on the bracket for locking the first and second fastening elements with the first and second retaining elements, wherein the slider locks the first and second fastening elements with the first and second retaining elements, the slider locks the second fastening element with the second retaining element when in a first release position such that the basket may be swivelled about the second swivel axis, and wherein the slider locks the first fastening element with the first retaining element when in a second release position such that the basket may be swivelled about the first swivel axis.

21 Claims, 5 Drawing Sheets

(51) Int. Cl.
*F16L 3/06* (2006.01)
*F16L 3/16* (2006.01)
*A47B 97/00* (2006.01)

(56) References Cited

U.S. PATENT DOCUMENTS

| | | | | |
|---|---|---|---|---|
| 4,748,913 | A * | 6/1988 | Favaretto | A47B 17/00 108/50.02 |
| 5,231,562 | A * | 7/1993 | Pierce | A47B 21/06 108/50.02 |
| 5,640,912 | A * | 6/1997 | Diffrient | A47B 21/06 108/23 |
| 5,690,403 | A * | 11/1997 | Ellison | A47B 21/06 108/50.02 |
| 5,971,509 | A | 10/1999 | Deimen et al. | |
| 6,170,407 | B1 * | 1/2001 | Hayward | A47B 3/0803 108/132 |
| 6,192,805 | B1 * | 2/2001 | Saylor | A47B 21/06 108/26 |
| 6,338,301 | B1 * | 1/2002 | Almond | A47B 21/06 108/26 |
| 6,410,855 | B1 * | 6/2002 | Berkowitz | A47B 21/06 108/50.02 |
| 6,415,723 | B1 * | 7/2002 | Kopish | A47B 3/0815 108/128 |
| 6,647,900 | B1 * | 11/2003 | Kopish | A47B 21/06 108/115 |
| 6,817,684 | B2 * | 11/2004 | Cattaneo | A47B 21/06 108/50.02 |
| 7,066,097 | B2 * | 6/2006 | Gayhart | A47B 21/06 108/50.02 |
| 7,407,392 | B2 * | 8/2008 | Cooke | A47B 21/06 108/62 |
| 7,871,280 | B2 * | 1/2011 | Henriott | A47B 21/06 108/50.02 |
| 8,196,525 | B2 * | 6/2012 | Flanet | A47B 17/00 108/28 |
| 2013/0081559 | A1 * | 4/2013 | Roh | A47B 97/00 108/50.02 |

FOREIGN PATENT DOCUMENTS

| | | |
|---|---|---|
| CN | 200998014 | 1/2008 |
| CN | 201523196 | 7/2010 |
| DE | 4103708 | 8/1992 |
| DE | 9313748 | 1/1994 |
| DE | 19728284 | 2/1999 |
| DE | 202009012275 | 4/2010 |
| DE | 102010024969 | 2/2011 |
| DE | 202011104139 | 1/2012 |
| EP | 0600108 | 6/1994 |
| EP | 1864591 | 12/2007 |

* cited by examiner

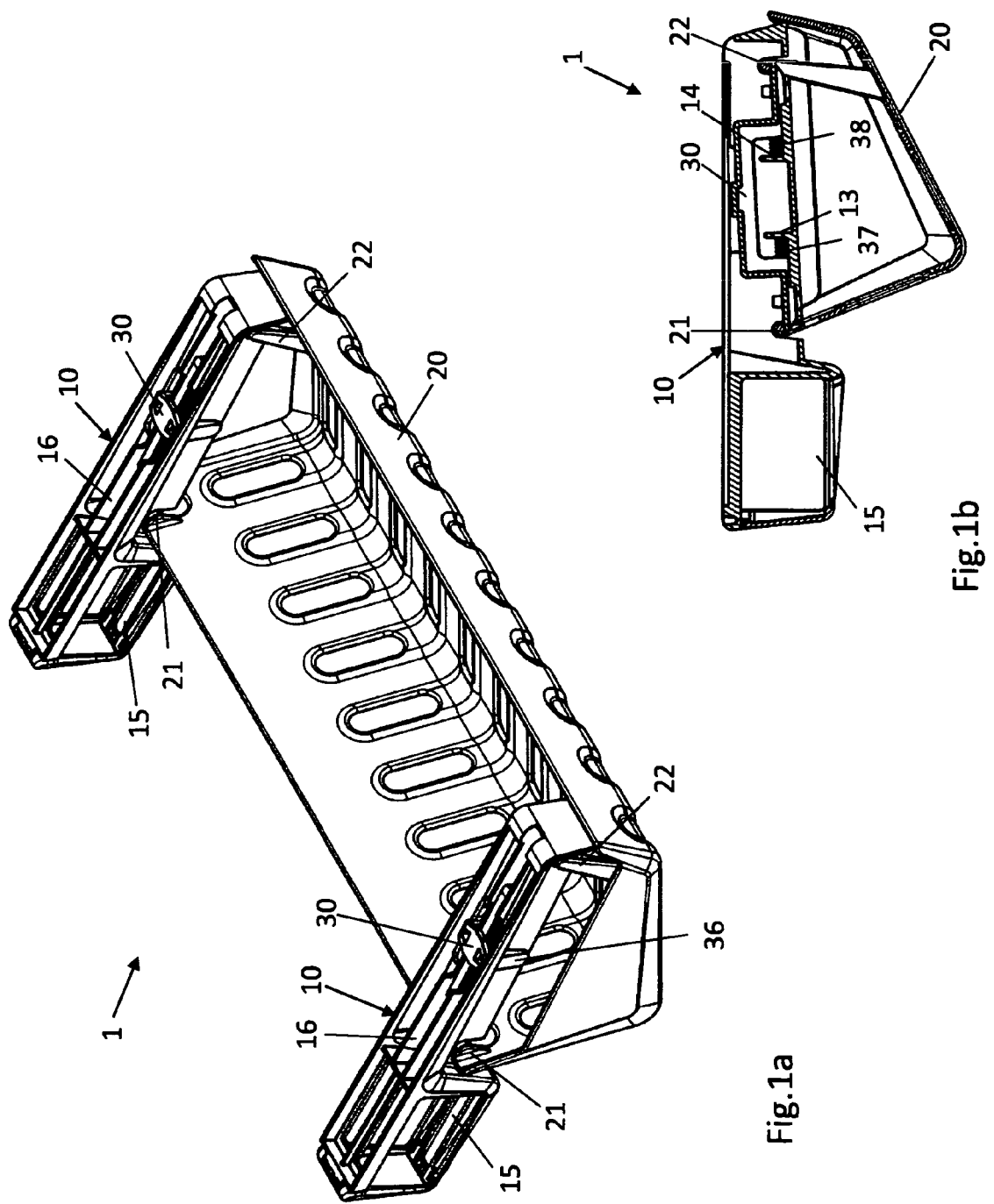

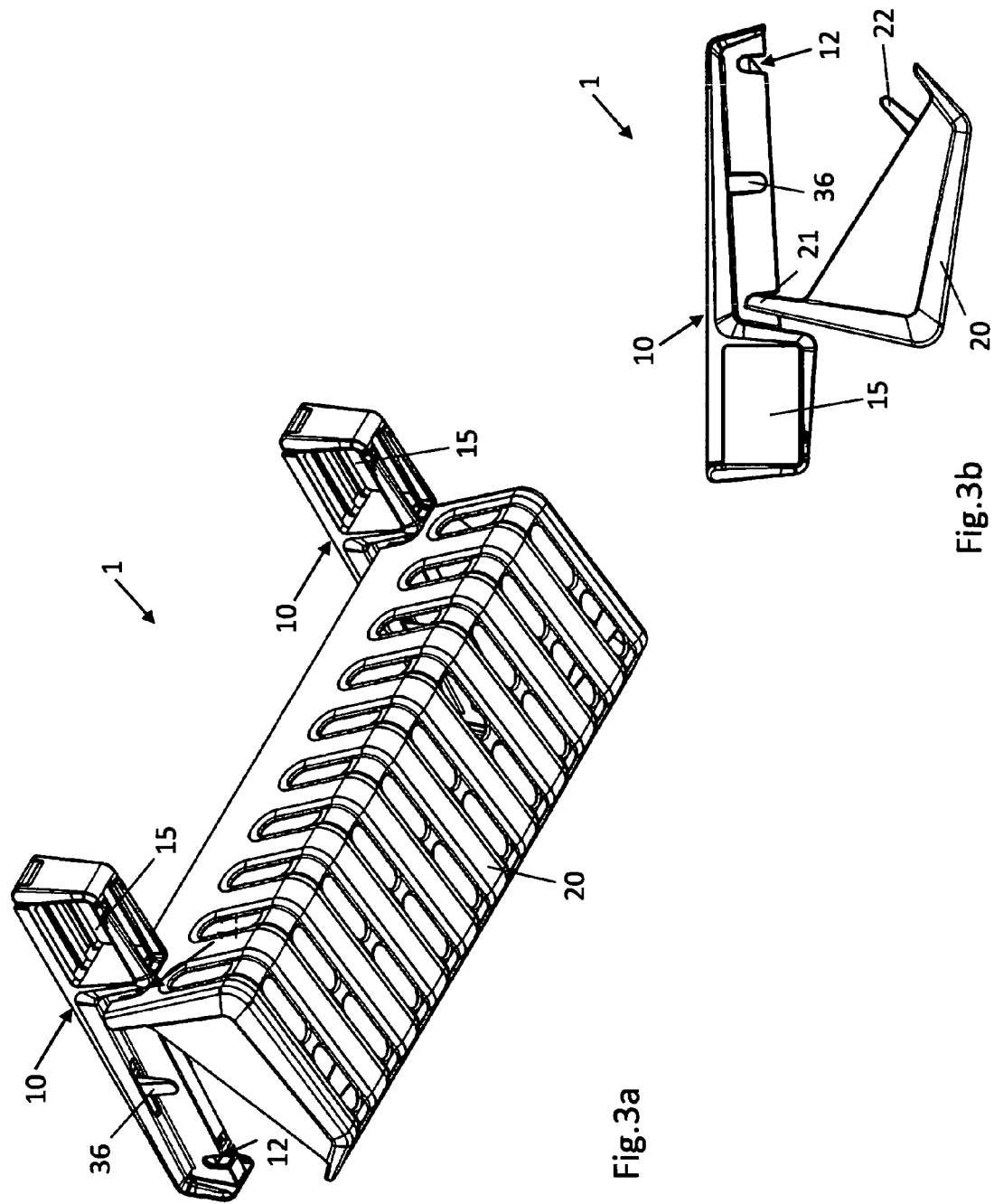

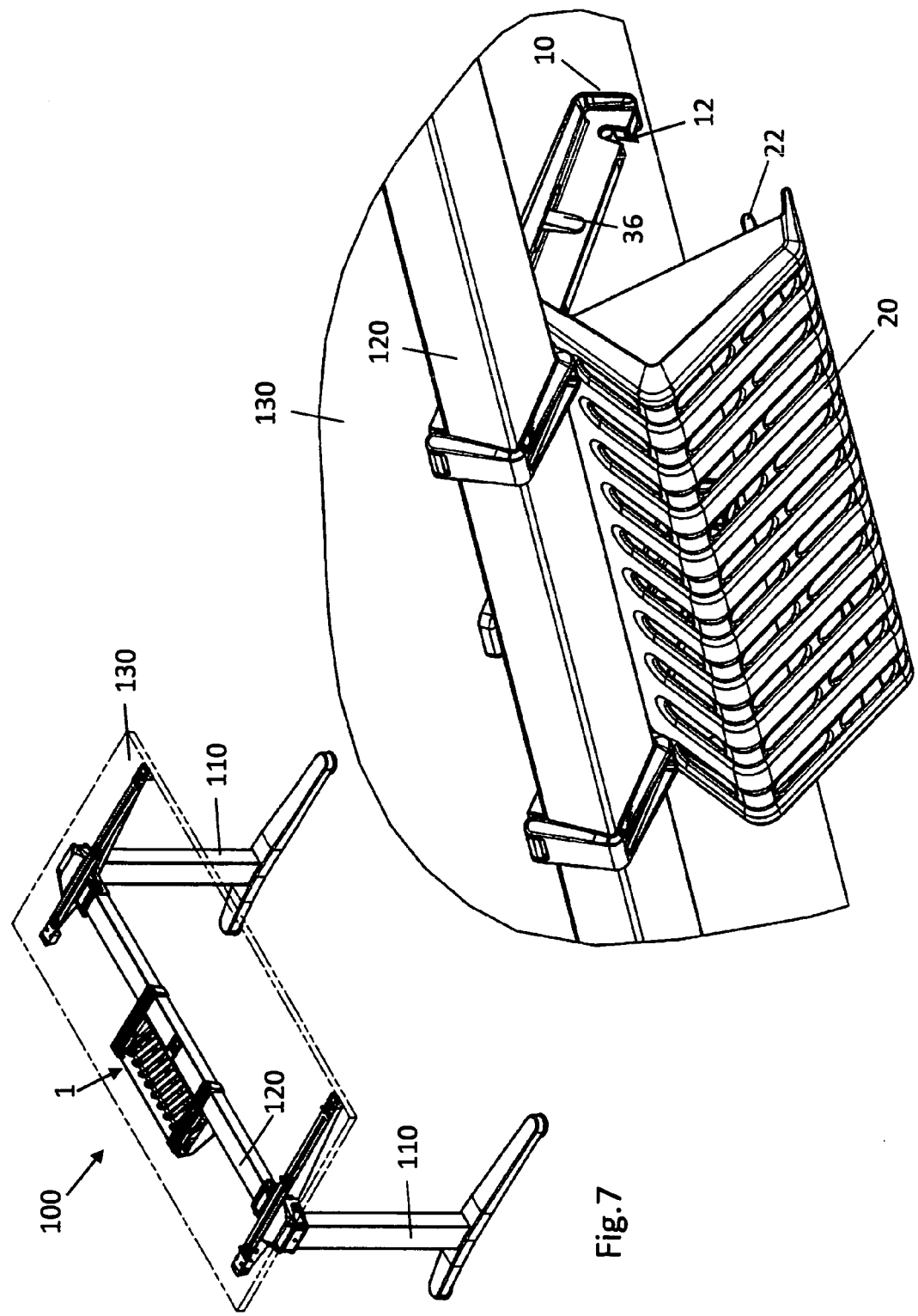

FURNITURE ACCESSORY IN THE FORM OF A CABLE BASKET

BACKGROUND OF THE INVENTION

The present invention relates to a furniture accessory in the form of a cable basket.

For furniture in the form of a table or a wall cupboard, electric cables and electric multiple socket outlets are preferably positioned under a table top or under a baseplate of the wall cupboard and are retained there by a cable basket so that the electric cables and electric multiple socket outlets do not lie on the floor where they would present a tripping hazard and, moreover, are disadvantageous from an aesthetic point of view.

In the case of conventional tables, in particular desks, which are known from the prior art, cable baskets are provided which are mounted under the table top. These cable baskets are fastened rigidly under the table top, i.e. in a manner such that they cannot tilt and cannot be varied in angle, so that the accommodation space thereof is always accessible. However, a disadvantage of these cable baskets is that the accommodation space or storage volume cannot be closed, and therefore cables or multiple socket outlets which are stored therein can fall out thereof relatively easily. Furthermore, the cables or multiple socket outlets stored in the accommodation space are visible from outside, which is disadvantageous from an aesthetic point of view.

DE 41 03 708 A1 discloses a cable duct for receiving cables. The cable duct comprises two side walls which enclose an angle of approximately 90° and on the respective end regions of which a respective retaining element is provided in the form of a retaining groove provided with an undercut. The two side walls form a bracket which can be connected, for example in the corner region of a room, to two walls or in the corner region of a table to a table top and to a rear wall of the table. The cable duct further comprises a lid, on the end regions of which fastening elements in the form of thickenings which are circular in cross section are respectively arranged. The fastening elements of the lid can be pressed into the retaining grooves through insertion openings, thereby making it possible to close an accommodation space of the cable duct. The accommodation space can be accessed by pulling a fastening element out of a retaining element, said retaining element being deformed at least temporarily in so doing. In this state, the lid can be swivelled relative to the bracket about a swivel axis, which is defined by the other retaining element. The cable duct can thereby be opened on two sides and can be loaded from two sides.

However, a disadvantage of this cable duct is that in order to connect the fastening elements to the retaining elements and to separate them, the retaining elements have to be at least temporarily deformed, and therefore the material of the retaining elements inevitably becomes fatigued, and the retaining elements can be damaged. Furthermore, the opening and closing procedures of the cable duct are very awkward, because the catch between the retaining elements and fastening elements has to be released or produced with a relatively great amount of force.

SUMMARY OF THE INVENTION

The object of the invention is to provide an improved and more reliable furniture accessory of the type mentioned at the outset, for which the opening and closing procedures are easy and can be carried out as often as desired, without the retaining elements and fastening elements being damaged.

The furniture accessory according to the invention comprises a slider which is displaceably mounted on the bracket and is provided for locking the first fastening element in/on the first retaining element and for locking the second fastening element in/on the second retaining element. The first and second retaining elements can be configured, for example, as retaining grooves, as retaining pins or as retaining beads. The first and second fastening elements can be configured in particular as fastening pins or alternatively as fastening grooves. In a locking position, the slider locks the first fastening element in/on the first retaining element and locks the second fastening element in/on the second retaining element. Therefore, in the locking position, a basket comprising the first fastening element and the second fastening element is rigidly connected to the bracket such that the angle thereof cannot be changed. Neither the first fastening element nor the second fastening element can be released from the corresponding first and second retaining elements. In a first release position, the slider locks the second fastening element in/on the second retaining element, the first retaining element being unlocked so that the first fastening element can be released from/out of the first retaining element and the basket can be swivelled about the second swivel axis. When the furniture accessory is correspondingly mounted on a table, the basket can then be opened towards the front of the table. In a second release position, the slider locks the first fastening element in/on the first retaining element, the second retaining element being unlocked so that the second fastening element can be released from/out of the second retaining element and the basket can be swivelled about the first swivel axis. When the furniture accessory is correspondingly mounted on a table, the basket can then be opened backwards towards the rear of the table. The slider 30 can be moved out of the locking position into the first release position by movement in a first direction. In this case, the first direction is the direction towards the second retaining element. Furthermore, the slider can be moved out of the locking position into the second release position by movement in a second direction which is opposite the first direction. In this case, the second direction is the direction towards the first retaining element.

The basket described above can be a cable basket. When the first and second retaining elements are in the form of retaining grooves, they have receiving openings or are designed as receiving openings. They can also be called receiving grooves. When the first and second fastening elements are in the form of fastening pins, they can be U-shaped or L-shaped fastening means and are connected in each case to the basket. Since the slider is used both for locking and unlocking the fastening elements in/on the retaining elements, the slider can also be called a locking/unlocking means.

By providing the slider which is mounted such that it can move in the first direction and in the second direction, it is thus possible to selectively achieve either locking of the first fastening element with the first retaining element and/or locking of the second fastening element in/on the first retaining element so that the basket can be opened on two sides of the bracket. In order to open or close the basket, the retaining elements and fastening elements do not have to be deformed, and therefore they are not subject to wear or are subject to greatly reduced wear. Furthermore, the opening and closing operations of the basket towards the front or towards the rear are designed to be very easy, since the slider merely has to be moved in the appropriate direction to unlock one of the fastening elements. Only a small amount of force needs to be exerted to move the slider. Since the basket can be opened towards the front and towards the rear, it can be filled, for example with cables or with multiple socket outlets or with other accessories, subject to the given conditions.

The furniture accessory preferably comprises two energy storage means which are respectively arranged between the slider and the bracket. In this case, a first energy storage means is designed to apply force to the slider in the second direction. A second energy storage means is designed to apply force to the slider in the first direction. In the locking position of the slider, the force applied to the slider by the first energy storage means balances out the force applied to the slider by the second energy storage means, and therefore, without the effect of an external force, the slider remains in the locked position. Consequently, it is also possible that in the locking position, neither the first energy storage means nor the second energy storage means exerts force on the slider. In the first release position, the first energy storage means exerts a greater force on the slider than the second energy storage means, and therefore the slider is moved into the locking position without the effect of an external force. By contrast, in the second release position, the second energy storage means exerts a greater force on the slider than the first energy storage means, and therefore the slider is moved into the locking position without the effect of an external force.

Consequently, by providing the first and second energy storage means, the slider is always moved into the locking position without the effect of an external force, and therefore the basket can be fastened reliably on the bracket. The energy storage means can preferably each be in the form of spring means and are supported on the bracket and on the slider respectively. The energy storage means are preferably connected to the slider.

Preferably, the first retaining element and the second retaining element are each in the form of retaining grooves in the bracket, and the first fastening element and the second fastening element are each in the form of fastening pins which are connected to the basket. The first fastening pin can be received in the first retaining groove and the second fastening pin can be received in the second retaining groove. The slider comprises a first locking arm and a second locking arm and in the locking position, the first locking arm locks the first fastening pin in the first retaining groove and the second locking arm locks the second fastening pin in the second retaining groove. By contrast, in the first release position, the second locking arm locks the second fastening pin in the second retaining groove, the first locking arm not locking the first fastening pin in the first retaining groove so that the first fastening pin can be removed from the first retaining groove and the basket can be swivelled about the second swivel axis. However, in the second release position, the first locking arm locks the first fastening pin in the first retaining groove, the second locking arm not locking the second fastening pin in the second retaining groove so that the second fastening pin can be removed from the second retaining groove and the basket can be swivelled about the first swivel axis.

In a corresponding embodiment of the first and second retaining elements and of the first and second fastening elements, locking and unlocking the fastening elements in the retaining elements is particularly simple.

The first locking arm preferably has a side which faces an opening in the first retaining groove and is bevelled such that by inserting the first fastening pin into the first retaining groove, the slider is moved out of the locking position towards the first release position. The second locking arm preferably has a side which faces an opening in the second retaining groove and is bevelled such that by inserting the second fastening pin into the second retaining groove, the slider is moved out of the locking position towards the second release position.

In a corresponding embodiment of the furniture accessory, it is not necessary to move the slider before inserting the fastening pins into the retaining grooves provided for this purpose, since, due to a force being applied to the slider by means of the fastening pins, the slider is automatically moved into the necessary open position.

The bracket preferably comprises a clamping means, which can be used to fasten the bracket to a cross member of a table, which cross member connects two table leg structures. Consequently, the furniture accessory can be fastened to the table without providing mounting holes for example in the table top. Furthermore, the furniture accessory can thereby be moved along the axial extent of the table cross member and can be positioned as desired.

It is of course also possible for the bracket to be fastened to the top of a table by means of screws.

BRIEF DESCRIPTION OF THE DRAWINGS

The invention will be described in greater detail below with reference to embodiments, in which:

FIG. 1a: is a three-dimensional view of a furniture accessory according to the invention, comprising two brackets and a basket which is held by means of two sliders which are arranged in the brackets, the sliders being located in a locking position in the brackets and holding the basket in a closed position;

FIG. 1b: is a side view of a cross section through the furniture accessory shown in FIG. 1a;

FIG. 2a: is a three-dimensional view of the furniture accessory, the basket being swung open towards the front;

FIG. 2b: is a side view of the furniture accessory shown in FIG. 2a;

FIG. 3a: is a three-dimensional view of the furniture accessory according to the invention, the basket being swung open towards the rear;

FIG. 3b: is a side view of the furniture accessory shown in FIG. 3a;

FIG. 6: is a three-dimensional view of the furniture accessory according to the invention which is fastened to the underside of a table top and is in a position which is open towards the rear; and FIG. 7: is a three-dimensional view of a piece of furniture in table form, comprising a furniture accessory according to the invention.

DETAILED DESCRIPTION OF THE PREFERRED EMBODIMENTS

Figures 2A, 2B:
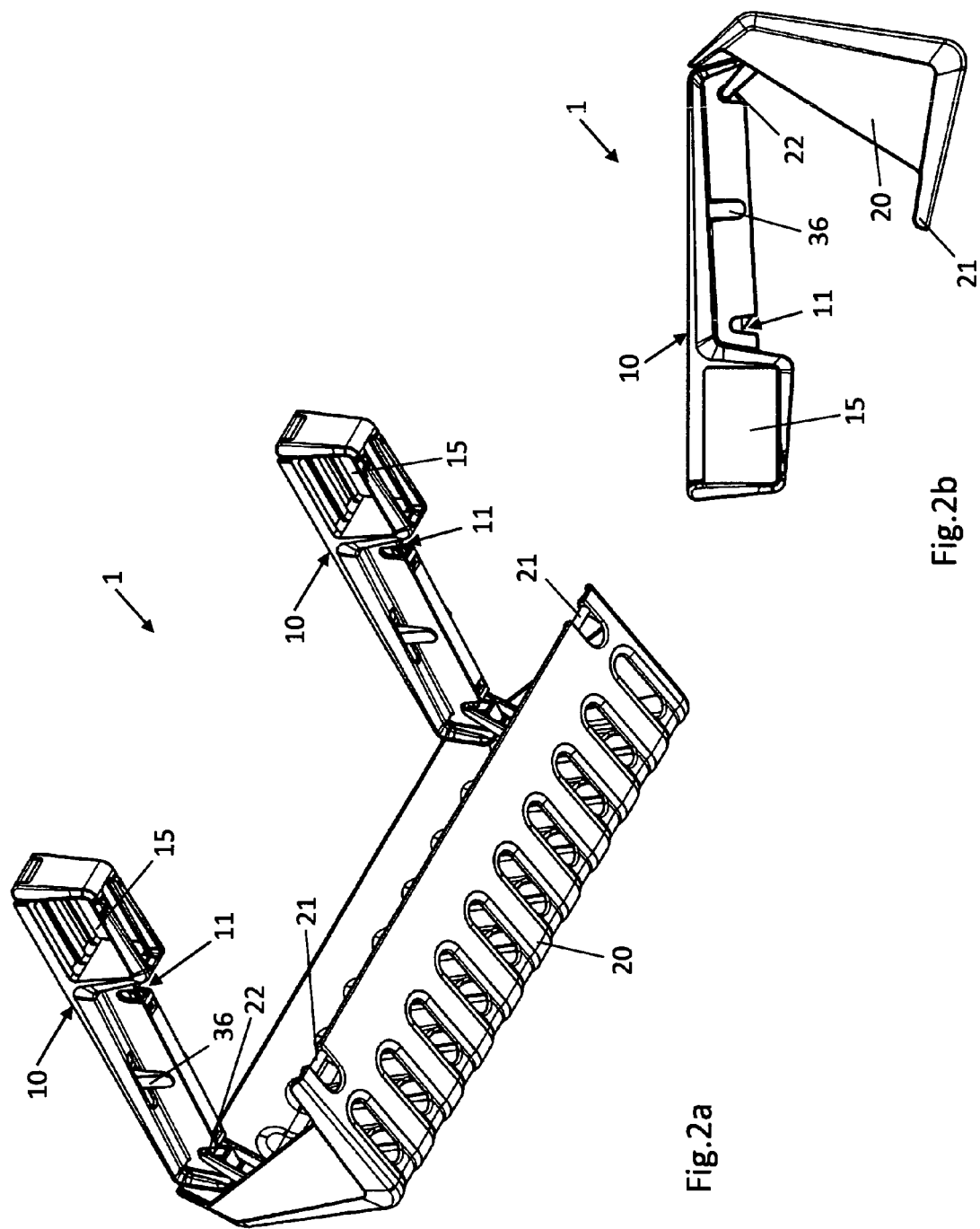

In the following description, the same reference signs denote the same components or the same features, and therefore a description of a component in respect of one drawing also applies to the other drawings, thus avoiding a repeated description.

FIGS. 1a and 1b show a furniture accessory 1 according to the invention in the form of a cable basket in a closed state. The furniture accessory 1, which is shown in FIGS. 1a and 1b, can be fastened for example to a piece of furniture 100 in the form of a table shown in FIG. 7. The table 100 shown in FIG.

7 comprises two table leg structures 110 which are interconnected by means of a cross member 120. A table top 130 is connected to the table leg structures 110. The furniture accessory 1 is fastened to the cross member 120 by clamping means 15 which will be described later. The longitudinal side of the table shown in FIG. 7 is the front, and the side which is opposite the front is the rear. However, the present invention is not restricted to the furniture accessory 1 being able to be fastened to an appropriate table 100. The furniture accessory 1 can also be fastened for example to a floor cupboard which can be arranged for example under a table and can be connected thereto.

In the embodiment shown in FIG. 1a to 6, the furniture accessory 1 according to the invention comprises two brackets 10 which can be fastened to the cross member 120 of a table 100 by the clamping means 15. However, the brackets 10 can also alternatively be fastened to the table top 130 by means of screws or by other fastening means. Each bracket 10 comprises a first retaining element 11 in the form of a first retaining groove and a second retaining element 12 in the form of a second retaining groove. The first retaining groove can be seen more clearly in FIGS. 2a and 2b, and the second retaining groove can be seen more clearly in FIGS. 3a and 3b.

The furniture accessory 1 also comprises a basket 20 in the form of a cable basket 20, at the two lateral end regions of which are arranged a first fastening element 21 and a second fastening element 22 respectively. The basket 20 thus comprises two first fastening elements 21 and two second fastening elements 22. The first and second fastening elements 21, 22 are each in the form of fastening pins 21, 22 which can be inserted into the corresponding first retaining grooves 11 and second retaining grooves 12 in the brackets 10. The basket 20 has an accommodation space in which cables, multiple socket outlets or other equipment can be accommodated. In FIGS. 1a and 1b, the basket 20 is shown in a closed position in which the first fastening pins 21 have been inserted into the retaining grooves 11 in the brackets 10 and the second fastening pins 22 have been inserted into the second retaining grooves 12 in the brackets 10. The first fastening pins 21 and the second fastening pins 22 are locked by means of sliders 30 which are provided in the brackets 10.

The sliders 30 are each movably mounted in guide channels 16 in the corresponding brackets 10. A slider 30 can be moved between a locking position, a first release position and a second release position. In FIG. 1b, the slider 30 is shown in the locking position.

Figure 4:
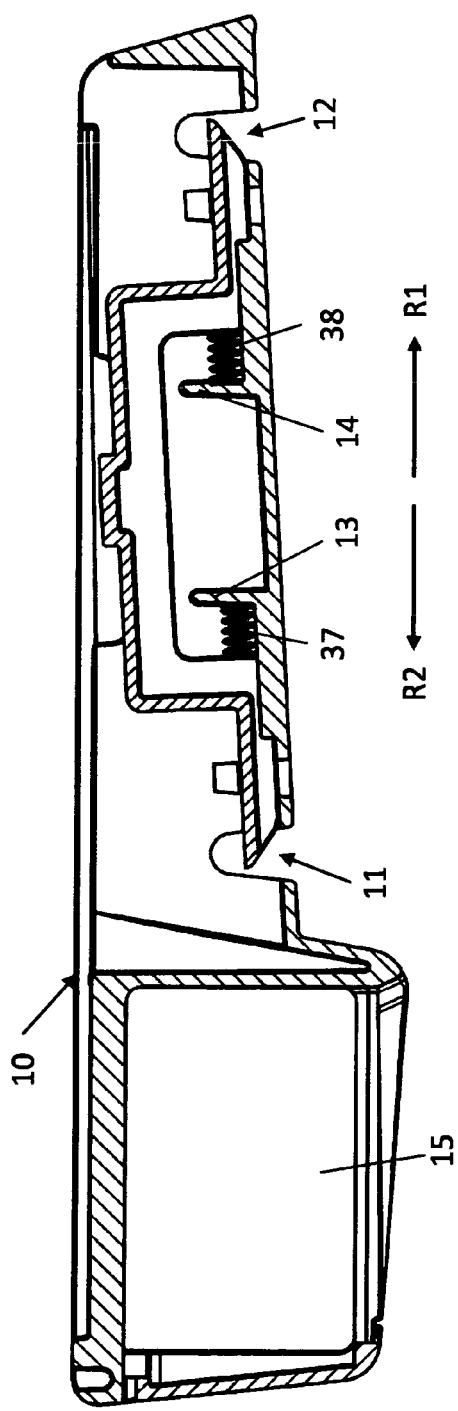
FIG. 4: is a side view of a bracket, shown in cross section, together with a slider and with energy storage means which are arranged between the slider and the bracket.
Figure 5:
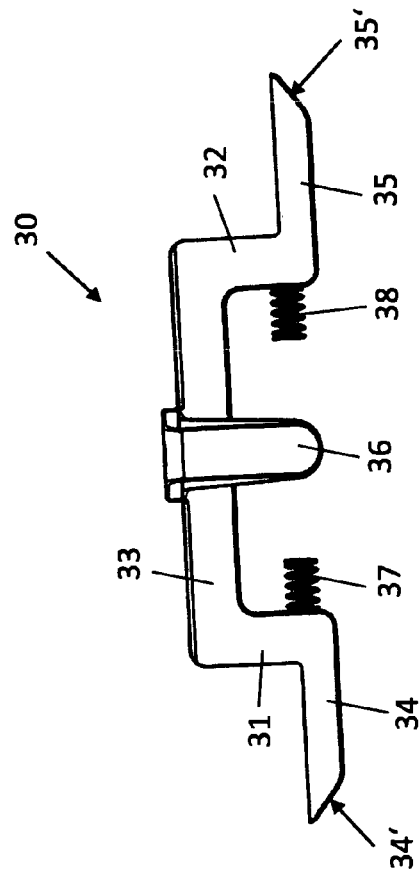
FIG. 5: is a side view of the slider together with energy storage means.

FIG. 4 shows a bracket 10 in cross section, comprising a slider 30 which is provided in the bracket 10, an actuating element 36 of the slider 30 not being shown. FIG. 5 shows the slider 30, which is shown in FIG. 4, on its own.

The slider 30 comprises a first locking arm 34 and a second locking arm 35 which is arranged opposite said first arm 34. The first locking arm 34 is connected to a first supporting arm 31 of the slider. The first supporting arm encloses an angle of approximately 90° with the first locking arm. The second locking arm 35 is connected to a second supporting arm 32, and the second locking arm and the second supporting arm together enclose an angle of approximately 90°. The slider 30 further comprises a connecting arm 33 which connects the first supporting arm 31 to the second supporting arm 32. The slider 30 also comprises the actuating element 36 which is connected to the connecting arm 33.

In the locking position, the first locking arm 34 locks the first fastening pin 11 in the first retaining groove 11, and the second locking arm 35 locks the second fastening pin 22 in the second retaining groove 12. Thus, in the locking position, the basket 20 cannot be released from the bracket 10 or brackets 10, and therefore cables or multiple socket outlets which are located in the accommodation space of the basket 20 cannot fall out and are hidden from view.

FIGS. 4 and 5 show that the furniture accessory 1 according to the invention further comprises a first energy storage means 37 in the form of a first spring means 37 or in the form of a first spring 37 and comprises a second energy storage means 38 in the form of a second spring means 38 or in the form of a second spring 38. FIG. 5 shows that the first spring 37 is connected to the first supporting arm 31, and the second spring 38 is connected to the second supporting arm 32 of the slider 30. However, the first spring 37 and the second spring 38 are not necessarily connected to the slider 38, but in alternative embodiments they can be merely supported on the supporting arms.

FIG. 4 shows that the bracket 10 comprises a first supporting wall 13 and a second supporting wall 14. The first spring 37 is arranged between the first supporting arm 31 of the slider 30 and the first supporting wall 30 of the bracket 10, and the second spring 38 is arranged between the second supporting arm 32 of the slider 30 and the second supporting wall 14 of the bracket 10. The actuating element 36 is arranged between the first supporting wall 13 and the second supporting wall 14.

The slider 30 can be moved by means of the actuating element 36 out of the locking position into the first release position by the slider 30 being moved in a first direction R1. In this case, the first direction R1 is the direction towards the second retaining groove 12. In the first release position, the second locking arm 35 locks the second fastening pin 22 in the second retaining groove 12, the first locking arm 34 of the slider 30 being moved towards the second retaining groove 12 to such an extent that the first locking arm 34 no longer locks the first retaining groove 11 so that a fastening pin 21 which is located in the first retaining groove 11 can be swivelled out. The first fastening pin 21 is thus no longer locked in the first retaining groove 11, and therefore the basket 20 can be swivelled about a second swivel axis which is defined by the second fastening pins 22. In FIGS. 2a and 2b, the furniture accessory 1 according to the invention is shown in a state in which the basket 20 has been swivelled about the second swivel axis so that the basket 20 is open towards the front of the table shown in FIG. 7. It is thus possible for the basket 20 to be loaded from the front of the table 100.

The slider 30 can also be moved from the locking position into a second release position by the slider 30 being moved in a second direction R2 which is opposite the first direction R1. In this case, the second direction R2 is the direction towards the first retaining groove 11.

In the second release position, the first locking arm 34 of the slider 30 locks the first fastening pin 21 in the first retaining groove 11, the slider 30 being moved towards the first retaining groove 11 to such an extent that the second locking arm 35 of the slider 30 no longer locks the second retaining groove 12 so that the second fastening pin 22 can be swivelled out of the second retaining groove 12. In this case, the basket 20 can be swivelled about a first swivel axis which is defined by the first fastening pin 22. When the basket 20 is swivelled about the first swivel axis, the basket 20 can be swung open towards the rear of the table 100 when the furniture accessory 1 is fastened to the table 100 shown in FIG. 7, so that the accommodation space of the furniture accessory 1 can be accessed from the rear of the table 100. A furniture accessory 1 which is swung open towards the rear of the table 100 is shown in FIGS. 3a and 3b.

FIG. 4 shows that in the locking position of the slider 30, the first spring 37 exerts the same force on the slider 30 as is exerted by the second spring 38 on the slider 30. Therefore, without the effect of an external force, the slider 30 remains in the locking position.

In the first locking position which would be reached if the slider 30 shown in FIG. 4 is moved to the right towards the second retaining groove 12, the first spring 37 is compressed to a greater extent than the second spring 38, since the first spring 37 is moved by the first supporting arm 31 of the slider 30 towards the first supporting wall 13. Consequently, in the release position, the first spring 37 exerts a greater force on the slider 30 than the second spring 38, and therefore the slider 30 is moved into the locking position without the effect of an external force. In the first locking position, the second spring 38 is either no longer in contact with the second supporting wall 14 or it exerts a reduced pressure on the slider 30 towards the locking position.

By moving the slider 30, which is shown in FIG. 4, to the left towards the first retaining groove 11, the slider 10 is moved into the second release position. In said second release position, the second spring 38, which is arranged between the second supporting arm 32 and the second supporting wall 14, is further compressed. The first spring 37, which is arranged between the first supporting arm 31 and the first supporting wall 13, can be removed from the first supporting wall 12 by moving the slider 30 towards the second release position, so that in the second release position, the first spring 37 does not exert any force or exerts a reduced force on the slider 30. Consequently, the force exerted on the slider 30 by the second spring 38 is greater than the force exerted on the slider 30 by the first spring 37, and therefore the slider 30 is moved into the locking position without the effect of an external force.

It can be seen from FIGS. 4 and 5 that the first locking arm 34 has a side 34' which faces an opening in the first retaining groove 11 and is bevelled such that by inserting the first fastening pin 21 into the first retaining groove 11, the slider 30 is moved out of the locking position towards the first release position. The second locking arm 35 also has a side 35' which faces an opening in the second retaining groove 12 and is also bevelled such that by inserting the second fastening pin 22 into the second retaining groove 12, the slider 30 is moved out of the locking position towards the second release position.

Consequently, it is possible to swivel a basket 20 which has been swivelled to one side back into the closed position so that the corresponding fastening pins 21, 22 are received in the corresponding retaining grooves 11, 12 again, without it being necessary for the slider/sliders 30 to be moved manually into the corresponding release position beforehand, because, by pressing the corresponding fastening pins 21, 22 into the retaining grooves 11, 12, the slider 30 is automatically pressed in the appropriate direction due to the bevelled sides 34', 35' of the slider 30.

It should be noted that the furniture accessory 1 according to the invention does not necessarily require two brackets 10; in fact, the functionality described above can also be achieved with only one bracket 10.

LIST OF REFERENCE SIGNS 1 furniture accessory
10 bracket
11 first retaining element/first retaining groove
11' opening in the first retaining groove
12 second retaining element/second retaining groove
12' opening in the second retaining groove
13 first supporting wall
14 second supporting wall
15 clamping means (of the bracket)
16 guide channel (for slider)
20 basket/cable basket/lid
21 first fastening element/first fastening pin
22 second fastening element/second fastening pin
30 slider
31 first supporting arm (of the slider)
32 second supporting arm (of the slider)
33 connecting arm (of the slider)
34 first locking arm (of the slider)
34' side of the first locking arm
35 second locking arm (of the slider)
35' side of the second locking arm
36 actuating element (of the slider)
37 first energy storage means/first spring means/first spring
38 second energy storage means/second spring means/second spring
100 piece of furniture
110 table leg structure
120 cross member
130 table top
R1 first direction
R2 second direction

The invention claimed is:

1. A furniture accessory comprising:
at least one bracket adapted to fasten to a piece of furniture and having a first retaining element and a second retaining element;
a basket having a first fastening element and a second fastening element, wherein the basket is fastened to the at least one bracket by at least one of the first fastening element held by the first retaining element and the second fastening element held by the second retaining element, and wherein the basket is swivelable relative to the bracket about a first swivel axis that is defined by the first retaining element and about a second swivel axis that is defined by the second retaining element;
a slider movably mounted on the bracket and configured to lock the first fastening element with the first retaining element and configured to lock the second fastening element with the second retaining element;
wherein the slider locks the first fastening element with the first retaining element and locks the second fastening element with the second retaining element when the slider is in a locking position;
wherein the slider locks the second fastening element with the second retaining element, and the first retaining element is unlocked so that the first fastening element may be released from the first retaining element and the basket may be swivelled about the second swivel axis when the slider is in the first release position;
wherein the slider locks the first fastening element with the first retaining element, and the second retaining element is unlocked so that the second fastening element may be released from the second retaining element and the basket may be swivelled about the first swivel axis when the slider is in the second release position;
wherein the slider is configured to be moved out of the locking position into the first release position by moving in a first direction; and
wherein the slider is configured to be moved out of the locking position into the second release position by moving in a second direction which is opposite the first direction.

2. The furniture accessory according to claim 1, further comprising:
two energy storage structures that are arranged between the slider and the bracket;

wherein the two energy storage structures include a first energy storage structure that is configured to apply force to the slider in the second direction, and a second energy storage structure that is configured to apply force to the slider in the first direction;

wherein the force exerted on the slider by the first energy storage structure balances out the force exerted on the slider by the second energy storage structure when the slider is in the locking position such that the slider remains in the locking position without any effect of an external force;

wherein the first energy storage structure is configured to exert a greater force on the slider than the second energy storage structure when the slider is in the first release position, such that the slider is moved into the locking position without the effect of an external force; and wherein the second energy storage structure is configured to exert a greater force on the slider than the first energy storage structure when the slider is in the second release position such that the slider is moved into the locking position without the effect of an external force.

3. The furniture accessory according to claim 2, wherein:
the bracket comprises a first supporting wall and a second supporting wall;
the slider comprises a first supporting arm and a second supporting arm;
the first energy storage structure is arranged between the first supporting wall and the first supporting arm and is at least one of supported on and connected to the first supporting wall and is at least one of supported on and connected to the first supporting arm; and
the second energy storage structure is arranged between the second supporting wall and the second supporting arm and is at least one of supported on and connected to the second supporting wall and is at least one of supported on and connected to the second supporting arm.

4. The furniture accessory according to claim 3, wherein:
the slider comprises a connecting arm that connects the first supporting arm to the second supporting arm;
the slider comprises an actuating element that is connected to the connecting arm and is arranged between the first supporting arm and the second supporting arm, and between the first supporting wall and the second supporting wall; and
the slider movable by the actuating element in the first direction and in the second direction.

5. The furniture accessory according to claim 4, wherein:
the first retaining element and the second retaining element include retaining grooves in the bracket;
the first fastening element and the second fastening element include fastening pins;
the first fastening pin is receivable in the first retaining groove, and the second fastening pin is receivable in the second retaining groove;
the slider comprises a first locking arm and a second locking arm;
the first locking arm locks the first fastening pin in the first retaining groove, and the second locking arm locks the second fastening pin in the second retaining groove when the slider is in the locking position;
the second locking arm locks the second fastening pin in the second retaining groove, and the first locking arm does not lock the first fastening pin in the first retaining groove such that the first fastening pin is removable from the first retaining groove and the basket is swivelable about the second swivel axis when the slider is in the first release position; and
the first locking arm locks the first fastening pin in the first retaining groove, and the second locking arm does not lock the second fastening pin in the second retaining groove such that the second fastening pin is movable from the second retaining groove and the basket is swivelable about the first swivel axis.

6. The furniture accessory according to claim 5, wherein:
the first locking arm has a side that faces an opening in the first retaining groove and is bevelled such that by inserting the first fastening pin into the first retaining groove, the slider is moved out of the locking position towards the first release position; and
the second locking arm has a side which faces an opening in the second retaining groove and is bevelled such that by inserting the second fastening pin into the second retaining groove, the slider is moved out of the locking position towards the second release position.

7. The furniture accessory according to claim 6, wherein the bracket comprises a clamp by which the bracket is fastened to a cross member of a table, and wherein the cross member connects two table leg structures.

8. The furniture accessory according to claim 1, wherein:
the first retaining element and the second retaining element include retaining grooves in the bracket;
the first fastening element and the second fastening element include fastening pins;
the first fastening pin is receivable in the first retaining groove, and the second fastening pin is receivable in the second retaining groove;
the slider comprises a first locking arm and a second locking arm;
the first locking arm locks the first fastening pin in the first retaining groove, and the second locking arm locks the second fastening pin in the second retaining groove when the slider is in the locking position;
the second locking arm locks the second fastening pin in the second retaining groove, and the first locking arm does not lock the first fastening pin in the first retaining groove such that the first fastening pin is removable from the first retaining groove and the basket is swivelable about the second swivel axis when the slider is in the first release position; and
the first locking arm locks the first fastening pin in the first retaining groove, and the second locking arm does not lock the second fastening pin in the second retaining groove such that the second fastening pin is movable from the second retaining groove and the basket is swivelable about the first swivel axis.

9. The furniture accessory according to claim 8, wherein:
the first locking arm has a side that faces an opening in the first retaining groove and is bevelled such that by inserting the first fastening pin into the first retaining groove, the slider is moved out of the locking position towards the first release position; and
the second locking arm has a side which faces an opening in the second retaining groove and is bevelled such that by inserting the second fastening pin into the second retaining groove, the slider is moved out of the locking position towards the second release position.

10. The furniture accessory according to claim 1, wherein the bracket comprises a clamp by which the bracket is fastened to a cross member of a table, and wherein the cross member connects two table leg structures.

11. A table, comprising:
a table top; and a furniture accessory according to claim 1, wherein the furniture accessory is fastened to at least one of the table top and a table frame.

12. The furniture accessory according to claim 11, further comprising:
two energy storage structures that are arranged between the slider and the bracket;
wherein the two energy storage structures include a first energy storage structure that is configured to apply force to the slider in the second direction, and a second energy storage structure that is configured to apply force to the slider in the first direction;
wherein the force exerted on the slider by the first energy storage structure balances out the force exerted on the slider by the second energy storage structure when the slider is in the locking position such that the slider remains in the locking position without any effect of an external force;
wherein the first energy storage structure exerts a greater force on the slider than the second energy storage structure when the slider is in the first release position, such that the slider is moved into the locking position without the effect of an external force; and
wherein the second energy storage structure exerts a greater force on the slider than the first energy storage structure when the slider is in the second release position such that the slider is moved into the locking position without the effect of an external force.

13. The furniture accessory according to claim 12, wherein:
the bracket comprises a first supporting wall and a second supporting wall;
the slider comprises a first supporting arm and a second supporting arm;
the first energy storage structure is arranged between the first supporting wall and the first supporting arm and is at least one of supported on and connected to the first supporting wall and is at least one of supported on and connected to the first supporting arm; and
the second energy storage structure is arranged between the second supporting wall and the second supporting arm and is at least one of supported on and connected to the second supporting wall and is at least one of supported on and connected to the second supporting arm.

14. The furniture accessory according to claim 13, wherein:
the slider comprises a connecting arm that connects the first supporting arm to the second supporting arm;
the slider comprises an actuating element that is connected to the connecting arm and is arranged between the first supporting arm and the second supporting arm, and between the first supporting wall and the second supporting wall; and
the slider movable by the actuating element in the first direction and in the second direction.

15. The furniture accessory according to claim 14, wherein:
the first retaining element and the second retaining element include retaining grooves in the bracket;
the first fastening element and the second fastening element include fastening pins;
the first fastening pin is receivable in the first retaining groove, and the second fastening pin is receivable in the second retaining groove;
the slider comprises a first locking arm and a second locking arm;
the first locking arm locks the first fastening pin in the first retaining groove, and the second locking arm locks the second fastening pin in the second retaining groove when the slider is in the locking position;
the second locking arm locks the second fastening pin in the second retaining groove, and the first locking arm does not lock the first fastening pin in the first retaining groove such that the first fastening pin is removable from the first retaining groove and the basket is swivelable about the second swivel axis when the slider is in the first release position; and
the first locking arm locks the first fastening pin in the first retaining groove, and the second locking arm does not lock the second fastening pin in the second retaining groove such that the second fastening pin is movable from the second retaining groove and the basket is swivelable about the first swivel axis.

16. The furniture accessory according to claim 15, wherein:
the first locking arm has a side that faces an opening in the first retaining groove and is bevelled such that by inserting the first fastening pin into the first retaining groove, the slider is moved out of the locking position towards the first release position; and
the second locking arm has a side which faces an opening in the second retaining groove and is bevelled such that by inserting the second fastening pin into the second retaining groove, the slider is moved out of the locking position towards the second release position.

17. The furniture accessory according to claim 16, wherein the bracket comprises a clamp by which the bracket is fastened to a cross member of a table, and wherein the cross member connects two table leg structures.

18. The furniture accessory according to claim 11, wherein:
the first retaining element and the second retaining element include retaining grooves in the bracket;
the first fastening element and the second fastening element include fastening pins;
the first fastening pin is receivable in the first retaining groove, and the second fastening pin is receivable in the second retaining groove;
the slider comprises a first locking arm and a second locking arm;
the first locking arm locks the first fastening pin in the first retaining groove, and the second locking arm locks the second fastening pin in the second retaining groove when the slider is in the locking position;
the second locking arm locks the second fastening pin in the second retaining groove, and the first locking arm does not lock the first fastening pin in the first retaining groove such that the first fastening pin is removable from the first retaining groove and the basket is swivelable about the second swivel axis when the slider is in the first release position; and
the first locking arm locks the first fastening pin in the first retaining groove, and the second locking arm does not lock the second fastening pin in the second retaining groove such that the second fastening pin is movable from the second retaining groove and the basket is swivelable about the first swivel axis.

19. The furniture accessory according to claim 18, wherein:
the first locking arm has a side that faces an opening in the first retaining groove and is bevelled such that by inserting the first fastening pin into the first retaining groove, the slider is moved out of the locking position towards the first release position; and the second locking arm has a side which faces an opening in the second retaining groove and is bevelled such that by inserting the second fastening pin into the second retaining groove, the slider is moved out of the locking position towards the second release position.

20. The furniture accessory according to claim 11, wherein the bracket comprises a clamp by which the bracket is fastened to a cross member of a table, and wherein the cross member connects two table leg structures.

21. The table according to claim 11, wherein the table comprises at least two table leg structures that are at a distance from one another and are interconnected by a cross member, and wherein the table comprises a furniture accessory according to claim 7 that is fastened to the cross member by the clamp.

* * * * *